A. WILLIAMS.
TRANSMISSION SYSTEM.
APPLICATION FILED DEC. 17, 1913.

1,172,091.

Patented Feb. 15, 1916.

Witnesses
E. Cloud Newman
M. C. Becker

Inventor
A. Williams
By Robt. F. Robb
Attorneys

UNITED STATES PATENT OFFICE.

ARCHIE WILLIAMS, OF CLIMAX, MINNESOTA.

TRANSMISSION SYSTEM.

1,172,091.  Specification of Letters Patent.  Patented Feb. 15, 1916.

Application filed December 17, 1913. Serial No. 807,285.

*To all whom it may concern:*

Be it known that I, ARCHIE WILLIAMS, a citizen of the United States, residing at Climax, in the county of Polk and State of Minnesota, have invented certain new and useful Improvements in Transmission Systems, of which the following is a specification.

The object of the present invention is to provide a novel transmission system adapted particularly for use in conjunction with gas tractors whereby to impart variable speeds to such machines, the aim in view being to so arrange the change speed mechanism as to form a compact and effective device of required strength for performing the necessary driving functions in this type of machinery.

In its essence the invention comprehends the provision of an axle for driving a tractor which axle is adapted to be operated by a driving shaft at variable speeds through the instrumentality of an intermediate transmission gear element.

It is further an object of my device to provide the axle aforesaid with a gear member with which a shiftable gear member is adapted to coöperate to produce variable speeds and which shiftable gear member is driven by means of transmission gearing members to which motion is imparted by a driving shaft, the gear member on the axle being of hollow formation to accommodate the differential gearing elements mounted therein.

Figure 1:
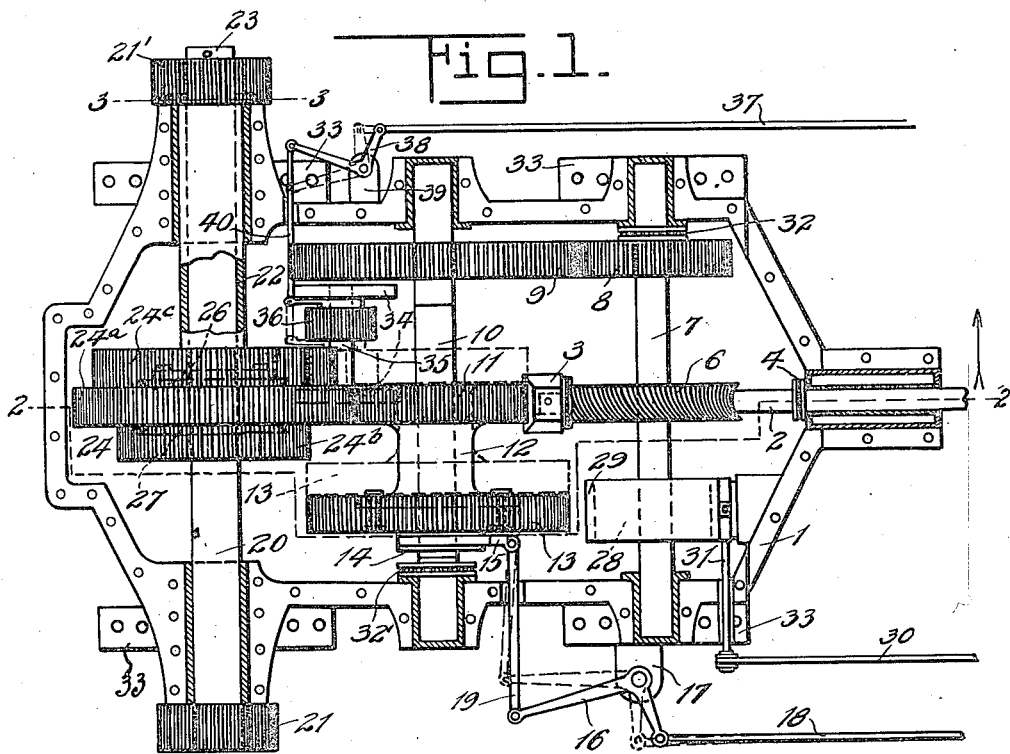
Figures 2, 3:
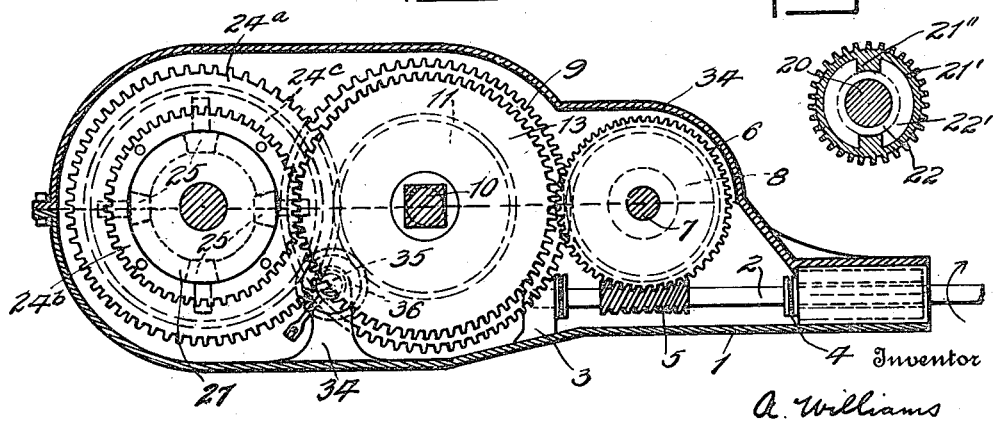

With the above and other objects in view, this invention consists in the construction, combination and arrangement of parts all as hereinafter more fully described, claimed and illustrated in the accompanying drawings, wherein:

Figure 1 is a plan view of a transmission system constructed in accordance with my invention, the casing being shown with the cover removed. Fig. 2 is a vertical longitudinal sectional view taken about on the line 2—2 of Fig. 1. Fig. 3 is a sectional view through the axle on the line 3—3 of Fig. 1.

Throughout the following detail description, and on the several figures of the drawing, similar parts are referred to by like reference characters.

Specifically describing my invention and referring to the drawing, the numeral 1 represents the base portion of a casing in the forward extremity of which is journaled the rear portion of the driving shaft 2, the extremity of said driving shaft having its bearing upon the vertical support 3 projecting upwardly from the interior of the casing 1. The drive shaft 2 is provided with a suitable ball thrust bearing 4 and adjacent its end portion is formed with a worm 5 meshing with a worm gear 6 which is mounted upon the driven shaft 7. The shaft 7 has its bearing in the sides of the casing 1 and adjacent one of said sides is provided with a driving gear 8 meshing with a large driving gear 9 fixedly secured to the countershaft 10. The countershaft 10 similar to the shaft 7 has its bearings in the sides of the casing 1 and for the greater portion of its length is square-shape in cross section. Upon the countershaft 10 is mounted a primary shiftable transmission gear element which consists of a small gear 11 having a web or sleeve 12 projecting laterally therefrom and to which sleeve is removably secured the large gear member 13. The gear member 13 is formed with a collar 14 with which the shifting yoke 15 coöperates for shifting of the transmission gear element aforesaid longitudinally of the shaft 10. The shifting action mentioned is performed through the instrumentality of the bell crank 16 mounted exterior to the casing 1 on a bracket 17, a rod 18 being connected to one arm of said lever while the other arm is connected by a rod 19 with the shifting yoke 15. It will be understood, of course, that the rod 18 is provided with the usual manipulating lever in the actual use of the transmission, which lever, however, is not shown in the drawing. At the rear portion of the casing 1 and mounted transversely of the same is disposed the axle 20 having secured to one extremity thereof the driving or master pinion 21. Upon the opposite end portion of the axle 20 is mounted a sleeve 22 having its bearing at the corresponding side of the casing 1 and removably secured to the outer extremity of the sleeve is a second driving or master pinion 21'. The sleeve is normally held in proper position upon the axle 20 by means of a pin or other suitable fastening member 23 passing through the shaft, said fastening member preventing the sleeve 22 from moving outwardly on the shaft 20, and maintaining the pinion 21' thereon. It will also be understood by those skilled in the art to which this invention refers that the master pinions 21 and 21' are adapted for driving the large drive wheels of the tractor which is of the usual type and is, therefore, not illustrated in the present drawing.

Disposed about the central portion of the axle shaft 20 is a secondary transmission gear element 24, within which are mounted the usual bevel pinions 25 shown most clearly in dotted lines in Fig. 2 of the drawing, there being in this case four such pinions with which the beveled differential gear 26 removably secured on the inner extremity of the sleeve 22 meshes, at one side, and with which the beveled differential gear 27, fixedly secured to the shaft, meshes at their opposite sides, the gears 25 aforesaid being so mounted that while they are carried around with the rotation of the large gear 24, they are at the same time free to revolve about their own spindles which point toward the center of the axle 20. The secondary gear element above mentioned comprises the large or low speed gear 24$^a$ and the smaller or high speed gear 24$^b$ which latter is a rim gear and removably secured to the large gear 24$^a$ about the differential gear 27. Said secondary gear element also includes a reverse gear 24$^c$ of the rim type detachably secured to the large gear 24$^a$ on the opposite side to the gear 24$^b$. As shown most clearly in Fig. 1 of the drawing, the primary transmission element is adapted to intermeshingly coöperate with the secondary gear element disposed about the axle 20 and by reason of the ratio of the gears of which these elements consist, variable speed may be transmitted to the axle.

Specifically describing the operation of the transmission hereinbefore set forth it will be understood that motion imparted to the driving shaft 2 will be transmitted through the worm gear 6 to the driven shaft 7 from thence to the countershaft 10 through the gears 8 and 9. In the position shown in Fig. 1 with the small gear 11 of the primary transmission element meshing with the large gear 24$^a$ of the secondary transmission element low speed is imparted to the axle 20.

To increase the speed or effect variation of said speed it is only necessary to actuate the rod 18 which, through the bell crank lever 16 and the rod 19, when the first-mentioned rod is moved rearwardly, will shift the primary gear element longitudinally on the squared portion of the countershaft 10 bringing the large gear member 13 of said element into mesh with the small gear element 24$^b$ of the secondary gear element, such sliding movement taking the gear 11 out of mesh with the gear 24$^a$ by reason of the spaced relation of said gears 11 and 13 of the primary transmission element. Movement of the rod 18 in the direction opposite to that described will, of course, shift the primary gear element so as to reduce the speed to low, bringing into meshing relation the transmission gears as shown in Fig. 1 of the drawing.

As will be obvious the relative longitudinal movements of the sleeve 22 and the axle 20 is prevented by means of the pin 23 and the gear 21 at opposite ends of the axle 20. More specifically speaking, the pin 23 prevents outward movement of the axle 20 by reason of its coöperation with the pinion 21' and the gear element 21 fixed to the outer end of the axle will prevent longitudinal movement of the sleeve 22, thereby insuring a proper intermeshing relation of the differential gears 26 and 27 with the pinions 25 of the differential mechanism contained within the secondary gear element 24.

In order to provide for braking action of the mechanism hereinbefore disclosed and the machine to which the same is attached, I provide on the driven shaft 7 a brake drum 28 surrounded with the usual brake band 29 which upon pulling action on the rod 30 will draw the band 29 tight through the instrumentality of the link 31 connecting said band and rod. The driven shaft 7 is provided at one end with the ball thrust bearing 32 as is usual in devices of this nature to take up the lateral thrust imparted to said shaft by the intermeshing of the worm 5 and the worm gear 6 and the shaft 10 has a similar bearing 32'. Brackets 33 are formed on the casing 1 for attaching the transmission mechanism hereinbefore described to the tractor frame and the casing 1 is preferably provided with a cover 34 so as to effectually house the mechanism contained therein.

In Fig. 3 is shown a detail view bringing out more clearly the formation of lugs 21" on the master pinion 21', which interlockingly engage in notches of the contiguous flange 22' formed at the end of the sleeve 22, the object in view being to arrange for the removal of the pinion or the shaft 20 after displacement of the key 23 without disturbing the remainder of the mechanism. Upon upstanding bearings or supports 34 is disposed a short shaft 35 carrying a shiftable reverse pinion 36. This pinion is operable by an independent lever, not shown, through the rod 37, the bell crank lever 38 supported by the bracket 39, and the connecting rod 40 which in turn is connected to said pinion 36. When it is desired to obtain reverse movement, the primary transmission element is shifted on the shaft 10 until the gear 11 is in line with the reverse gear 24$^c$ of the secondary transmission element, the pinion 36 being then independently shifted on its shaft 35 into meshing relation with both gears 24$^c$ and 11, thereby imparting reverse movement to the transmission shaft 20, the relative positions of the gearing being shown in dotted lines in Fig. 1.

Having thus described my invention, what I claim as new is:

A transmission system of the class described, the combination of an axle, a driving shaft, a driven shaft having worm and gear conections with and adapted to be actuated by said driving shaft, a counter shaft intermediate the axle and the driven shaft, gear members connecting said counter and driven shafts, a primary transmission element on the counter shaft and comprising relatively small and large gears, a secondary transmission element mounted on the axle and comprising small and large forward speed gears and a reverse gear, a short shaft disposed intermediate the counter shaft and the axle, a reverse pinion shiftable laterally on and longitudinally of the said short shaft into meshing relation between the reverse gear on the secondary transmission element and the small gear on the primary transmission element when the latter is disposed with the small gear opposite to the reverse gear aforesaid, means for shifting the primary transmission element longitudinally on the counter shaft to obtain variable forward and reverse speeds, and means for slidably shifting the reverse pinion on its shaft.

In testimony whereof I affix my signature in presence of two witnesses.

ARCHIE WILLIAMS.

Witnesses:
  N. Rosholt,
  F. G. Hinze.